(12) United States Patent
Grözinger

(10) Patent No.: US 8,017,056 B2
(45) Date of Patent: Sep. 13, 2011

(54) SALT CORES FOR PLASTIC (INJECTION) MOLDING

(75) Inventor: Dieter Hans Grözinger, Diespeck (DE)

(73) Assignee: Emil Muller GmbH, Wilhermsdoft (DE)

( * ) Notice: Subject to any disclaimer, the term of this patent is extended or adjusted under 35 U.S.C. 154(b) by 0 days.

(21) Appl. No.: 12/307,688

(22) PCT Filed: Jul. 9, 2007

(86) PCT No.: PCT/EP2007/006065
§ 371 (c)(1),
(2), (4) Date: Mar. 25, 2009

(87) PCT Pub. No.: WO2008/003518
PCT Pub. Date: Jan. 10, 2008

(65) Prior Publication Data
US 2009/0289392 A1    Nov. 26, 2009

(30) Foreign Application Priority Data
Jul. 7, 2006    (DE) .......................... 10 2006 031 531

(51) Int. Cl.
*B28B 7/30* (2006.01)
*B28B 7/34* (2006.01)
*B29C 45/00* (2006.01)

(52) U.S. Cl. ................. 264/313; 264/328.1; 264/328.14

(58) Field of Classification Search .................. None
See application file for complete search history.

(56) References Cited

U.S. PATENT DOCUMENTS

| 4,904,423 | A | * | 2/1990 | Foreman et al. | ............... 264/489 |
| 5,253,924 | A | * | 10/1993 | Glance | ........................ 297/452.1 |
| 5,492,660 | A | * | 2/1996 | Vyletel et al. | .................. 264/86 |
| 5,575,533 | A | * | 11/1996 | Glance | ........................ 297/452.2 |
| 2001/0040305 | A1 | | 11/2001 | Moschini | |
| 2007/0000410 | A1 | | 1/2007 | Pitamitz et al. | |
| 2007/0036941 | A1 | | 2/2007 | Groezinger | |

FOREIGN PATENT DOCUMENTS

| DE | 103 59 547 B3 | 3/2005 |
| EP | 0 313 923 A2 | 5/1989 |
| EP | 0 718 085 A1 | 6/1996 |
| EP | 0 909 600 A1 | 4/1999 |
| WO | WO-2004/071738 A1 | 8/2004 |
| WO | WO-2005/058527 A1 | 6/2005 |

\* cited by examiner

*Primary Examiner* — Monica A Huson
(74) *Attorney, Agent, or Firm* — Birch, Stewart, Kolasch & Birch, LLP

(57) ABSTRACT

Water-soluble salt cores are used in molds for the production of hollow moldings by plastic molding.
The production of hollow plastic moldings is effected by positioning a water-soluble salt core in a mold, molding a thermoplastic molding material around the salt core and, after solidification of the thermoplastic molding material, washing out the salt core with a water-containing solvent.

9 Claims, 1 Drawing Sheet

SALT CORES FOR PLASTIC (INJECTION) MOLDING

Figure 1:

The invention relates to the use of water-soluble salt cores in molds for the production of hollow moldings by plastic molding, a corresponding process for the production of hollow plastic moldings and the hollow plastic moldings obtainable by this process.

Various industrial processes are known for the production of plastic moldings. Solid moldings are produced, for example, by injection molding in hollow molds. For hollow bodies or similar products, blowmolding may be a suitable process.

In the injection molding of hollow moldings, two half-molds are usually produced and subsequently have to be connected. It is necessary here to comply with manufacturing tolerances in order to ensure an exact fit. The mechanical stability of such joined components is not always sufficient.

It is an object of the present invention to provide a process for the production of hollow plastic moldings which avoids the disadvantages of the known processes and permits the production of hollow moldings without a seam. Preferably, the hollow moldings should have improved mechanical and/or thermal stability.

The object is achieved, according to the invention, by using water-soluble salt cores in molds for the production of hollow moldings by plastic molding. The plastic molding is preferably a plastic injection molding with thermoplastic molding materials.

The object is also achieved by a process for the production of hollow plastic moldings by positioning a water-soluble salt core in a mold, molding a thermoplastic molding material around the salt core and, after solidification of the thermoplastic molding material, washing out the salt core with a water-containing solvent.

It was found according to the invention that the processes known from aluminum diecasting for the production of hollow moldings can be applied to plastic molding materials with the use of water-soluble salt cores.

The thermal and pressure load on the salt cores and molds in metal diecasting and plastic injection molding is substantially different, as are the temperature and heat capacity of the casting material. The behavior of the casting material during casting is also substantially different. It has been seen to date that, owing to the substantially different material and material processing properties, metal casting with the use of salt cores cannot be applied to plastic (injection) molding. It has now been found that the salt cores withstand the pressure in plastic injection molding. Salt cores which contain binders are particularly advantageously used. However, it is also possible to use salt cores comprising pure salts, i.e. without binders or additives.

For a description of aluminum diecasting with the use of water-soluble salt cores, reference may be made to DE-B-103 59 5477 EP-A-1 293 276, EP-A-0 019 015, EP-A-0 501 549, U.S. Pat. No. 3,963,818, WO 2004/082866 and further documents of the prior art. Further information on metal diecasting processes appears among the documents discussed below in the case of the binders.

The metal diecasting process is also described in Castings, John Campbell, Elsevier Butterworth Heinemann Publishers, 1991 (reprinted 2004).

For a description of the injection molding process, reference may be made to Römpp Chemielexikon [Römpp Chemistry Lexicon], 9th Edition, keyword "Spritzgießen [Injection molding]". This process is used mainly in the case of noncurable molding materials which solidify in the mold by cooling.

The thermoplastic molding materials (for example powders, grains, cubes or pastes) are heated until they liquefy and are then injected under high pressure up to 1400 bar into closed, two-part, e.g. steel, water-cooled hollow molds where they cool and solidify. The melting and heating of the molding materials are effected, for example, in extruders.

Thermoplastic molding materials which may be used are all suitable molding materials of this type. The plastic molding material is preferably based on styrene homo- and copolymers, polyolefin homo- and copolymers, polyamides, polycarbonates, polyethers, polyesters, polyketones, polysulfones, polyurethanes, poly-elastomers and mixtures thereof. Further plastics, such as polyarylene oxides, polyarylene sulfides, polyimides, polyetherimides, polyetheretherketones, acetals, etc., may also be used. Particularly preferably, the plastic molding materials are based on polystyrene, polystyrene/acrylonitrile, polyethylene, polypropylene, polyamide-6, polyamide-66, polycarbonates, poly(meth)acrylates, polyvinyl chloride or mixtures thereof.

The individual polymers may contain additives and fillers. For example, they may be made impact resistant by rubber particles. Examples of such molding materials are ABS and ASA molding materials which contain a butadiene or acrylate rubber in the form of small particles. Polymer blends, i.e. mixtures of polymers, may also be used. The molding materials may additionally contain additives, such as molding auxiliaries, dyes, pigments, fibers or other fillers.

According to an embodiment of the invention, the plastic molding materials are fiber-reinforced, it being possible for preferably from 10 to 60% by weight, particularly preferably from 20 to 40% by weight, in particular from 25 to 35% by weight, of fibers, based on the total molding material, to be present. Glass fibers, carbon fibers, mineral fibers, etc. may be used. Glass fibers, which may be provided with a (e.g. silane or borate) size, are preferred. Short or long fibers may be used. Other fillers, such as whiskers, mica, beads, etc., may also be used. With the use of glass fibers, it is possible to produce shaped articles having a substantially constant wall thickness. In the customary production by welding of mold halves, the wall thickness of the weld bead must as a rule be doubled.

Widely used plastics are LDPE (low density polyethylene), HDPE (high density polyethylene), PP (polypropylene), PVC (polyvinyl chloride) and PS (polystyrene).

In the case of rubbers, styrene-butadiene, polybutadiene, ethylene-propylene, polychloroprene, polyisoprene, nitrile, butyl, silicone and urethane rubber may be mentioned. In the case of the polyesters and polyethers, for example, cellulose ethers and cellulose esters may also be mentioned, and the use of foamed plastics is also possible.

Since the hollow plastic moldings according to the invention are preferably used in the automotive sector, they are preferably produced from those materials which are usually used in this area and which are stable under the ambient conditions. Polystyrene, polyethylene and polypropylene may be mentioned as particularly preferred examples. Impact-modified acrylonitrile-butadiene-styrene (ABS) copolymers or acrylate-styrene-acrylonitrile (ASA) copolymers may also be preferably used.

The salt core is based on water-soluble salts, such as sodium chloride or potassium chloride, which are used in suitable particle size. Further water-soluble salts may also be present. In addition, smaller amounts of water-insoluble salts may likewise be present in the salt cores. For further possible ingredients, reference may be made to the abovementioned documents on metal diecasting. The documents mentioned below and relating to the binders also contain further information on possible ingredients of the salt cores. The salt cores are particularly preferably used together with inorganic phosphates, as described in DE-B-103 59 547.

The binders can be chosen according to the practical requirements and can be adapted to the respective salt cores. Thus, the cores may or may not be compacted and may or may not be sintered. Furthermore, they may or may not be bound. The salt cores may be composed of all salts usually used. In addition to the preferred sodium chloride and potassium chloride, it is also possible to use potassium nitrate, potassium nitrite, sodium nitrate, sodium nitrite, copper chloride, lithium chloride, lead chloride, magnesium chloride, barium chloride, calcium chloride and mixtures thereof. Suitable mixtures are described, for example, in WO 01/02112. The salt cores may be modified by fibers or whiskers or additives. For example, graphite, silicon, aluminum oxide or silicon carbide may be used as additives. These additives are likewise described in WO 01/02112. Furthermore, drying agents, such as magnesium carbonate or magnesium phosphate, may be used, as also described in WO 85/04605. It is also possible to use expansion modifiers in order to control the thermal expansion and to avoid stress ruptures. Examples of suitable expansion modifiers are aluminum oxide, glass powder, copper alloys, graphite, talc or fine aluminum oxide/silicate fibers. Such modifiers are likewise described in WO 85/04605. Alkali metal metasilicates and mixtures thereof with alkali metal disilicates may furthermore be used as core materials. For example, from 20 to 70% by weight of metasilicate can be combined with from 30 to 80% by weight of disilicate. Potassium and/or lithium metasilicate in combination with potassium and/or lithium disilicate are an example, to which sodium disilicate and/or sodium metasilicate may be added, cf. for example, GB-A-949 066. The addition of aluminum oxide to salt cores for smoothing the surfaces is likewise possible and is described, for example, in JP-A-60118350.

The abovementioned ingredients or additives can be used instead of or in addition to binders, as described below.

Binders suitable for salt cores may be organic and/or inorganic compositions. They may be low molecular weight, oligomeric or polymeric compounds. It is also possible to use mixtures of organic and inorganic binders. All customary suitable organic and/or inorganic binders may be used. The amounts are preferably from 0.2 to 20% by weight, particularly preferably from 0.5 to 10% by weight, in particular from 1 to 5% by weight, based on the total salt core.

Examples of suitable inorganic binders are phosphates, as described, for example, in DE-B-103 59 547. According to this embodiment, inorganic phosphates or mixtures of inorganic phosphates may be used. Suitable phosphates are, for example, alkali metal phosphates and metal phosphates, for example sodium phosphate, sodium polyphosphate, sodium tripolyphosphate, aluminum phosphates, such as monoaluminum phosphate, boron phosphate, as well as potassium phosphates, for example tetrapotassium pyrophosphate. Monosodium phosphate may also be used. In general, the phosphates may be derived from (poly)phosphate chains of different length. Individual phosphate units may be present, as, for example, in monosodium phosphate. Longer phosphate chains having a different chain number may also be present, as in tripolyphosphate or tetrapolyphosphate. They are derived from the monomeric phosphate by elimination of water, which leads to diphosphates, triphosphates and finally polyphosphates. These chains may also be combined to form rings, resulting in so-called metaphosphates, which are trimetaphosphates, tetrametaphosphates, etc., according to the number of phosphoric acid units.

In the phosphates, one or more or all hydrogen atoms may be replaced by metals, for example alkali metals or aluminum. The same applies in the case of replacement by boron. Suitable phosphates are designated in some cases as refractory binders. Suitable amounts of phosphate binders are in the range from 0.5 to 10% by weight, based on the final salt mixture. From 1 to 5% by weight are particularly preferably employed. Release agents may also be used.

Suitable phosphates are in particular sodium polyphosphate and sodium hexametaphosphate as well as phosphoric acid per se, as also described, for example, in DE-A-195 25 307. According to the invention, free phosphoric acid and oligomeric or polymeric phosphoric acids may also be used in addition to the phosphates. Suitable phosphate binders are also described, inter alia, in SU-A-16 39 872.

Polyphosphate chains or borate ions for use as binders are also described in U.S. Pat. No. 5,573,055. The polyphosphate chains and/or borate ions are preferably derived from at least one water-soluble phosphate and/or borate glass. Furthermore, bentonites may also be used as binders.

Further suitable binders are described in U.S. Pat. No. 5,711,792. Polyphosphate chains and borate ions are likewise mentioned. The water-soluble phosphate glass can preferably contain from 30 to 80 mol % of $P_2O_5$, from 20 to 70 mol % of $X_2O$, from 0 to 30 mol % of MO and from 0 to 15 mol % of $L_2O_3$, where X is Na, K or Li, M is Ca, Mg or Zn and L is Al, Fe or B. Particularly preferably, the water-soluble phosphate glass contains from 58 to 72% by weight of $P_2O_5$, from 28 to 42% by weight of $Na_2O$ and from 0 to 16% by weight of CaO. Preferred glass systems are derived from $Na_2O$ and $P_2O_5$, for example 5 $Na_2O$ and 3 $P_2O_5$. It is also possible for $K_2O$ to be additionally present in the glasses. It is also possible to use a molecular sieve material, for example having the structure $Na_{86}[(AlO_2)_{86}(SiO_2)_{106}].H_2O$, as a binder. Such systems are likewise described in U.S. Pat. No. 5,711,792.

Furthermore, borax, magnesium oxide, talc and/or alkaline earth metal salts may be used as inorganic binders. These binders can likewise be used in amounts of from 0.5 to 10% by weight. They are described, for example, in U.S. Pat. No. 3,356,129.

These binders are prepared by dissolving the corresponding water-soluble glasses in aqueous solution and are used in this form. The amounts to be used are once again preferably from 0.5 to 10% by weight, based on the final salt mixture.

Further molecular sieves and waterglass which can be used according to the invention and further silicic acids are known to the person skilled in the art.

The binders described in DE-A-19 24 991 and intended for cores can also be used according to the invention. The addition of up to 10% by weight of borax, magnesium oxide or talc individually or as a mixture is described there. In addition, these ingredients can be used together with waterglass, or waterglass can be used alone as a binder in order to achieve high compressive and flexural strength. Reference may additionally be made to GB-A-1 274 966.

It is, for example, also possible according to the invention to cover or to coat the salt crystals with borax or waterglass in order to ensure better processability.

In addition to the phosphate systems and silicate systems described and mixtures thereof, further inorganic systems which are derived, for example, from sulfates or carbonates and further metal salts, may also be used. Suitable systems are known to the person skilled in the art.

Other suitable inorganic binders are therefore gypsum or cement, it being possible for these to be the forms not yet set with water or the forms set with water. Gypsum may therefore be present as hemihydrate or as dihydrate. Cement is as a rule a mixture of calcium silicates, calcium aluminates and calcium ferrites, i.e. composed of CaO with $SiO_2$, $Al_2O_3$ and $Fe_2O_3$ in different ratios.

Furthermore, the inorganic binders can be used in combination with organic binders. For example, waterglass and a synthetic resin can be used as binders, as described in U.S. Pat. No. 3,764,575. Waterglass and a synthetic resin are combined as a binder in a ratio of from 1:10 to 10:1, preferably from 1:5 to 5:1, in particular from 2:1 to 1:2. The synthetic resin may be a condensate based on furan or phenol.

Any suitable organic binders which can be used as binders for salt cores can also be used according to the invention. These are in particular oligomeric or polymeric systems, but low molecular weight organic compounds, such as, for example, sugars, may also be used.

Suitable organic binder systems are known in some cases from the prior art for salt cores. For example, paraffin waxes, synthetic organic resins, such as polystyrene, or silicone resins may be used. It is also possible to use polyethylene glycols which have, for example, a molecular weight in the range from 4000 to 8000, preferably from 5000 to 7000. Such binder systems are described, for example, in GB-A-2 105 312 and EP-A-0 127 367. Such systems are also referred to, for example, in U.S. Pat. No. 5,573,055. A system comprising alkali metal or alkaline earth metal chlorides, sulfates or borates, waterglass and synthetic resins as a binder is described, for example, in U.S. Pat. No. 3,764,575.

Suitable organic binders are in particular natural and synthetic polymers. Natural polymers are, for example, cellulose and cellulose derivatives, such as carboxy-methylcellulose, cellulose acetate, cellulose acetobutyrates as well as other cellulose esters and cellulose ethers. Further cellulose derivatives can be formed by oxidation reactions or by elimination of water. In this context, reference may be made to the keywords "Cellulose", "Cellulose-Derivate [Cellulose Derivatives]", "Cellulose-Ester [Cellulose Esters]" and "Cellulose-Ether [Cellulose Ethers]" in Römpp Chemielexikon [Römpp Chemistry Lexicon], 9th Edition.

Further natural polymers are casein or starch.

Furthermore, polysaccharides and also low molecular weight sugars may be used. Suitable synthetic binders are, for example, polyvinylpyrrolidone and polymers derived therefrom, such as vinylpyrrolidone-styrene copolymers, vinylpyrrolidone-vinyl acetate copolymers and similar polymers. Polyalkylene glycols and ethers thereof may also be used, in particular polyethylene glycol. The polymers may be used in pulverulent, particulate or latex form.

Furthermore, the industrial plastics, such as polyolefins, for example polyethylenes and polypropylenes, polystyrenes, polyvinyl chlorides, polyamides, polyurethanes, polyesters, polyethers, polysulfones, polyetherketones, polycarbonates, etc., are suitable. Polymeric resins can also be used according to the invention, for example polyester resins or epoxy resins. These may be one-component or two-component systems. Organic binders are usually used in amounts of 0.5-10% by weight, based on the total salt mixture.

Polymer dispersions which can be used may be based, for example, on acrylates or styrene/butadiene.

Examples of suitable polymers are polystyrene, polyethylene, polyvinyl chloride, polybutadiene, poly-acrylonitrile, polymethyl methacrylates, polyethylene terephthalates, polyamide 6, polyamide 66. Special polymer classes are acetals, polyamides, polyamido-imides, polyacrylates, polycarbonates, polyesters, polyethers, polyetherketones, polyetherimides, polyimides, polyphenylene oxides, polyphenylene sulfides and polysulfones. Among resins, phenol-formaldehyde resins, urea-formaldehyde resins, unsaturated polyester resins, epoxy resins and melamine-formaldehyde resins may be mentioned in particular. Among rubbers, styrene-butadiene rubbers, polybutadiene rubbers, ethylene-propylene rubbers, polychloroprene rubbers, polyisoprene rubbers, nitrile rubbers, butyl rubbers, silicone rubbers and urethane rubbers may be mentioned in particular.

The polymers may have been obtained by free radical, anionic, cationic or radiation polymerization. Organic polymers used according to the invention are in particular vinylic polymers. These copolymers can be applied by any suitable methods to the salts for the formation of the solidified salt cores. They can be applied, for example, in molten or dissolved form. The amounts which are suitable and necessary in the individual case can be determined by the person skilled in the art by simple manual experiments.

A special class of suitable polymers comprises polyacetals, in particular polyoxymethylenes and copolymers thereof. These are frequently used instead of paraffin or polyolefin dispersants. It is also possible to use mixtures of polyoxymethylene homo- or copolymers and a polymer not miscible therewith as a binder. Polyoxymethylene homo- or copolymers preferably have a melting point of at least 150° C. and molecular weights (weight average) in the range from 5000 to 150 000. For example, mixtures of polyoxymethylene, homo- and copolymers and polymers based on olefins, vinylaromatic monomers, vinyl esters, vinyl alkyl ethers or alkyl methacrylates may be used. Suitable polymers are described, for example, in EP-B-0 951 460 and EP-B-1 276 811. For polyoxymethylenes, too, reference may additionally be made to EP-A-0 413 231, EP-A-0 444 475, EP-A-0 465 940 and EP-A-0 446 708. For removing the binder, the latter can be treated with a gaseous, acid-containing atmosphere. Appropriate processes are described, for example, in DE-A-39 29 869 and DE-A-40 00 278 and EP-B-1 276 811 and EP-B-0 951 460.

Organic polymers suitable according to the invention as binders are, for example, in particular the polymers used for injection molding applications.

Further suitable organic binders are, for example, bitumen and tar. For further suitable binders, reference may be made to the keyword "Bindemittel [Binder]" in Römpp Chemielexikon [Römpp Chemistry Lexicon], 9th Edition.

The salt cores are preferably produced by pressing under pressure and subsequent heat treatment, a pressure in the range from about 600 to 2000 bar and a temperature below 730° C., preferably from 200 to 650° C., being employed. Pressing under pressure and heat treatment can also be carried out simultaneously. The salt cores according to an embodiment of the invention are therefore highly compacted.

Molding by plastic injection molding is preferably effected at temperatures in the range from 100 to 400° C. and pressures in the range from 100 to 2000 bar. Depending on the starting temperature of the thermoplastic molding material, the mold may be heated or cooled in order to achieve optimum flow behavior of the molding material and optimum cooling behavior. It is also possible according to the invention to preheat the salt core prior to molding in order to ensure better flow of the molding material. The preheating temperature is preferably not more than 200° C. If the salt core is not preheated, it may serve in an advantageous manner for quenching the molding material or allowing the latter to solidify.

According to the invention, any desired hollow plastic molding can be produced by the process. Hollow moldings preferably originate from the automotive sector, in particular motor sector. The hollow moldings preferably have connections or channels for carrying fluids or represent said connections or channels. Examples of suitable hollow moldings are water connections and pipe systems for carrying fluids. This may involve, for example the carrying of water, air, fuel or oil. Water is also understood as meaning aqueous systems, such as brake fluid, cooling water, etc.

The hollow moldings according to the invention are preferably used where diecast aluminum parts have been used to date but hollow plastic moldings are sufficiently stable. In addition to a cost saving, the hollow moldings according to the invention can also result in a weight reduction, which in turn can lead to a saving of fuel.

The hollow plastic moldings produced according to the invention may also have internals, such as valves or flaps. These internals or components can be installed subsequently in the hollow moldings. However, it is also possible to introduce these components into the salt core itself and to fix them there so that they are already present in the correct position in the subsequent hollow molding. This avoids subsequent mounting, and an increased mechanical and thermal stability is achieved by formation of the hollow molding as a single part.

The component may be, for example, a mechanical and/or electrical/electronic component which has an interlocking connection with the salt core. It can, for example, subsequently be connected completely or partly in a mobile or flexible manner to the hollow molding. The component may also perform a supporting function for the core. Usually, however, the component does not perform a supporting function and does not increase the mechanical stability in comparison with a solid salt core. According to the invention, it may be substantially or completely enclosed by the salt core. For example, only the axles or axle bearings may rest against the surface of the salt core so that the axle or the axle bearing is subsequently firmly connected to the molding.

The invention is explained in more detail by the following example.

EXAMPLE

First, different salt cores were produced in an M shape by compression of salt. The length of the M-shaped salt core was about 12 cm. The salt core was produced by pressing under pressure and optionally subsequent heat treatment. Different salt mixtures were used. Firstly, standard salt (NaCl) was employed; secondly, fine salt (NaCl) was employed. The salts were used without further binders. In addition, binder-containing salt mixtures which have a phosphate-containing binder were employed.

The salt core was introduced into a mold and covered with polystyrene in the injection molding process. The premelting temperature was from 230 to 260° C. The salt core was fixed to the tips of the M in the mold, and the gates to the M shape were located at the outer edges at the lower end of the flanks of the M.

In a second experiment, the plastic material used was polypropylene. The material was melted at a temperature of 230° C. in the heated cylinder and in the melt storage space before it was injected.

A major part of the salt cores could be injected without any fracture of the salt core occurring. When the gates are moved to the two outer shoulders of the M, the proportion of fractured salt cores could be further substantially reduced.

It was found that, by means of the process according to the invention, it is possible to inject plastics around salt cores without the salt cores experiencing significant fractures.

Further improved results were obtained if the salt cores were preheated before the injection molding. By preheating the cores, better flow behavior of the plastic and better fixing in the mold are achieved.

The basic procedure is shown in the attached drawing in FIG. 1. From top to bottom, a salt core in the M shape, the salt core covered by injection molding and the plastic body after washing out of the salt core are shown.

The invention claimed is:

1. A process for the production of hollow plastic moldings by positioning a water-soluble salt core in a mold, molding a thermoplastic molding material around the salt core and, after solidification of the thermoplastic molding material, washing out substantially the entire salt core with a water-containing solvent, wherein the salt core is not heated to a molten state before being removed from the solidified thermoplastic molding material by washing with the water-containing solvent, and wherein the water-soluble salt core comprises in addition to water-soluble salt 0.2 to 20% weight, based on the total salt core, of organic and/or inorganic binders, and wherein the water-soluble salt is selected from the group consisting of sodium chloride, potassium chloride, potassium nitrate, potassium nitrite, sodium nitrate, sodium nitrite, copper chloride, lithium chloride, lead chloride, magnesium chloride, barium chloride, calcium chloride and mixtures thereof.

2. The process as claimed in claim 1, wherein the binders are inorganic phosphates or mixtures of inorganic phosphates.

3. The process as claimed in claim 1, wherein the molding is effected by plastic injection molding.

4. The process as claimed in claim 1, wherein the molding is effected with a thermoplastic molding material based on styrene homo- and copolymers, polyolefin homo- and copolymers, polyamides, polycarbonates, polyethers, polyesters, polyketones, polysulfones, polyurethanes, elastomers and mixtures thereof.

5. The process as claimed in claim 4, wherein the plastic molding materials are based on polystyrene, polystyrene/acrylonitrile, polyethylene, polypropylene, polyamide-6, polyamide-66, polycarbonates, poly(meth)acrylates, polyvinyl chloride or mixtures thereof.

6. The process as claimed in claim 1, wherein the plastic molding material contains from 10 to 60% by weight of fibers or fillers, based on the total weight.

7. The process as claimed in claim 1, wherein the salt core is preheated before the molding.

8. The process as claimed in claim 1, wherein the hollow moldings have or represent connections or channels for carrying fluids.

9. The process as claimed in claim 1, wherein the hollow moldings originate from the automotive sector.

* * * * *